US009521886B2

(12) United States Patent
Siagri et al.

(10) Patent No.: US 9,521,886 B2
(45) Date of Patent: Dec. 20, 2016

(54) ATTACHMENT DEVICE FOR A WEARABLE ELECTRONIC APPARATUS AND WEARABLE ELECTRONIC APPARATUS COMPRISING SAID ATTACHMENT DEVICE

(75) Inventors: Roberto Siagri, Artegna (IT); Roberto Turchi, Bologna (IT); Giampietro Tecchiolli, Trento (IT); Stefano Adami, Volano (IT)

(73) Assignee: EUROTECH SPA, Amaro (IT)

( * ) Notice: Subject to any disclaimer, the term of this patent is extended or adjusted under 35 U.S.C. 154(b) by 834 days.

(21) Appl. No.: 12/667,558

(22) PCT Filed: Jul. 4, 2008

(86) PCT No.: PCT/EP2008/058666
§ 371 (c)(1),
(2), (4) Date: Jan. 4, 2010

(87) PCT Pub. No.: WO2009/007316
PCT Pub. Date: Jan. 15, 2009

(65) Prior Publication Data
US 2010/0176166 A1 Jul. 15, 2010

(30) Foreign Application Priority Data
Jul. 6, 2007 (IT) .............................. UD2007A0124

(51) Int. Cl.
*A45F 5/00* (2006.01)
*A44C 5/00* (2006.01)
(Continued)

(52) U.S. Cl.
CPC ............... *A44C 5/0007* (2013.01); *A44C 5/14* (2013.01); *G06F 1/163* (2013.01); *A45F 2005/008* (2013.01)

(58) Field of Classification Search
CPC .................. A45F 5/00; A45F 2005/008; A45F 2200/0516; A44C 5/0007; A44C 5/14; G06F 1/163
(Continued)

(56) References Cited

U.S. PATENT DOCUMENTS 4,401,233 A * 8/1983 Frey ................................ 221/36
5,068,840 A * 11/1991 Buckner ....................... 368/281
(Continued)

FOREIGN PATENT DOCUMENTS

| CA | 2 497 785 A1 | 8/1996 |
| CH | 664 072 A5 | 2/1988 |

(Continued)

*Primary Examiner* — Corey Skurdal
(74) *Attorney, Agent, or Firm* — Hedman & Costigan, P.C.; James V. Costigan; Kathleen A. Costigan

(57) ABSTRACT

An attachment device for attaching a wearable electronic apparatus to a part of the body of an operator. The attachment device includes a support member, which includes an assembly zone on which the wearable electronic apparatus is located and an attachment element, which clamps the support member to the part of the body of the operator. Attachment/detachment structure, which is selectively releasable, is provided in association with the assembly zone in order to cooperate with corresponding attachment portions of the wearable electronic apparatus.

15 Claims, 2 Drawing Sheets

(51) Int. Cl.
*A44C 5/14* (2006.01)
*G06F 1/16* (2006.01)

(58) Field of Classification Search
USPC ....... 224/271, 219, 221, 222, 665, 169, 171, 224/242, 247, 930
See application file for complete search history.

(56) References Cited

U.S. PATENT DOCUMENTS

| | | |
|---|---|---|
| 5,657,201 A | 8/1997 | Kochis |
| 6,508,451 B1 | 1/2003 | Blythe et al. |
| 7,077,302 B2 * | 7/2006 | Chuang ........................ 224/420 |
| 2002/0089193 A1 | 7/2002 | Terasawa et al. |
| 2002/0186530 A1 | 12/2002 | Nakajima et al. |
| 2003/0101778 A1 | 6/2003 | Carl et al. |

FOREIGN PATENT DOCUMENTS

| | | |
|---|---|---|
| GB | 2 411 552 A | 8/2005 |
| IT | 2005A000156 | 9/2005 |
| IT | 2005A000157 | 9/2005 |
| IT | 2007A000055 | 3/2007 |

\* cited by examiner

218
ATTACHMENT DEVICE FOR A WEARABLE ELECTRONIC APPARATUS AND WEARABLE ELECTRONIC APPARATUS COMPRISING SAID ATTACHMENT DEVICE

CROSS-REFERENCE TO RELATED APPLICATION

This application is a section 371 of International Application No. PCT/EP2008/058666, filed Jul. 4, 2008, which was published in the English language on Jan. 15, 2009, under International Publication No. WO 2009/007316 A1, and the disclosure of which is incorporated herein by reference.

FIELD OF THE INVENTION

The present invention concerns an attachment device for an electronic apparatus wearable on a part of the body and the wearable electronic apparatus comprising said attachment device.

In particular, the attachment device is advantageously used for attachment to the wrist, but it can also be used equivalently for attachment to other parts of the body, such as the fore-arm or other parts of the arm, the ankle or other parts of the leg.

Moreover, the attachment device is advantageously applied, but not necessarily, to wearable electronic apparatuses, typically used in the military and industrial field, even if its application can be extended substantially to any field, including sports, free time, excursions or other.

The present invention is also applied, however, to particularly bulky and/or heavy electronic work instruments, which have to be worn for a long time, and is suitable to be used from time to time, with specialized electronic apparatuses, for specific functions.

BACKGROUND OF THE INVENTION

Electronic processors wearable on the wrist are known, for example from the Italian patent applications UD2005A000156 and UD2006A000157 in the name of the present Applicant, which are provided with a containing body to house the relative electronic devices. The containing body is shaped in a wrap-around and ergonomic manner, so as to surround at least the upper part of the user's wrist. Closing bands, bracelets or straps, attached to the processor, are provided as an auxiliary on the lower part of the containing body in order to complete the secure attachment of the processor to the wrist.

In this case, the attachment system is always solid with the wearable processor and the removal of the latter also entails the complete removal of the attachment. The optimum attachment operation to the wrist requires a certain time, which is not negligible, and requires interrupting the work in progress, and the attachment must also be restored.

Wearable electronic processors are also known, for example from the Italian patent applications UD2007A000055, which have an integrated attachment device, conformed as a bracelet and consisting of lateral parts of the containing body of the electronic processor, which surrounds the lateral and lower part of the wrist, and selectively able to be assembled and dis-assembled on/from the computer by means of mechanical anchorage elements. In this solution, the attachment device also functions as a containing compartment for part of the electronic components of the electronic processor and therefore, together with the mechanical anchorage means, electric connection means are also provided. Once the electronic processor has been uncoupled and removed from the wrist, the attachment device is no longer autonomously wearable on the wrist either, since the worn condition of the attachment device is determined by the cooperation between parts of the electronic processor and parts of the attachment device itself, and it must be replaced for the subsequent uses.

In this case too, it takes a determinate time, not negligible, to remove and especially to restore, the attachment of the electronic processor to the wrist, and it is also necessary to interrupt the work in progress.

The time required for attachment/detachment is a critical factor, in particular in the use of wearable electronic apparatuses which must be removed temporarily and quickly from the wrist or with a high frequency during habitual use, therefore typically used in the military and industrial fields. For this reason these computers are reinforced and are extremely robust, solid and easy to use.

The time required for attachment/detachment is also important in those cases where a work instrument on the wrist, bulky and/or heavy, must be worn for specific operations to be carried out, of limited duration with respect to the daily work cycle.

Purpose of the present invention is to achieve an attachment device for a wearable electronic apparatus, and a wearable electronic apparatus comprising said attachment device, which allows a rapid attachment and detachment to/from the part of the body with which it is associated, so as to temporarily eliminate a large part of the bulk and/or weight of the electronic processor, without for this reason having to remove the attachment device also, and to restore the optimum positioning thereof in an extremely short time, in the order of several seconds.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, an attachment device according to the present invention is used to attach a wearable electronic apparatus to a part of the body of an operator, advantageously but not only, the wrist.

According to a characteristic feature of the present invention, the attachment device comprises a support member of the anatomical type, which includes both an assembly zone on which the wearable electronic apparatus is located, and also an attachment element by means of which the support member is clamped to said part of the body of the operator.

Attachment/detachment means of the selectively releasable type are provided in association with said assembly zone in order to cooperate with corresponding attachment portions of the wearable electronic apparatus, so as to be able to temporarily combine the electronic apparatus with the support member and to remove the electronic apparatus quickly, for example from the user's wrist, leaving the attachment device in an assembled position on the body, and without altering the configuration in any way.

According to a variant, the support member is of the rigid type.

Alternatively, the support member is of the flexible type.

According to a variant of the invention, the attachment device is of the flexible type, for example a bracelet with a wrap-around anatomical part, made of rubber material such as neoprene and welded inside the support member, and a connection part consisting of a strap and buckle, which closes around the wrist.

Alternatively, the attachment element is of the rigid type.

According to a variant of the invention the support member is formed by a substantially flat central wall, defining the assembly zone, on which a base wall of the wearable electronic apparatus is located, and by two lateral sides defining a housing seating shaped like a band in which a first surface of said part of the body of an operator is housed, partly surrounded.

According to a variant, the attachment element is able to surround at least a second surface of said part of the body of an operator, substantially complementary to the first surface.

One form of embodiment provides that the support member has an attachment end on which a portion of the attachment element is located, so that the element and the support member, when they are connected, surround said part of the body completely and stably.

With the present invention, therefore, we have the possibility of temporarily eliminating a large part of the bulk and/or weight of the electronic apparatus, without for this reason having to remove the attachment device as well; it is also possible to restore the optimum positioning thereof, in an extremely limited time, in the order of a few seconds.

The support member and the attachment element, during normal use, remain attached to the part of the user's body and are ready for a new attachment and detachment, but, by acting on the attachment element, they can also be removed, for example at the end of the cycle or of the working day. They are also very light and not at all bulky, thus providing ideal comfort for the user.

An advantageous variant provides that the attachment means comprises first attachment elements able to cooperate due to geometric coupling with a corresponding first attachment portion of a base wall of the wearable electronic apparatus.

Another variant provides that the attachment means comprises second attachment elements able to cooperate in snap-in manner with a corresponding second attachment portion located on the base wall.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
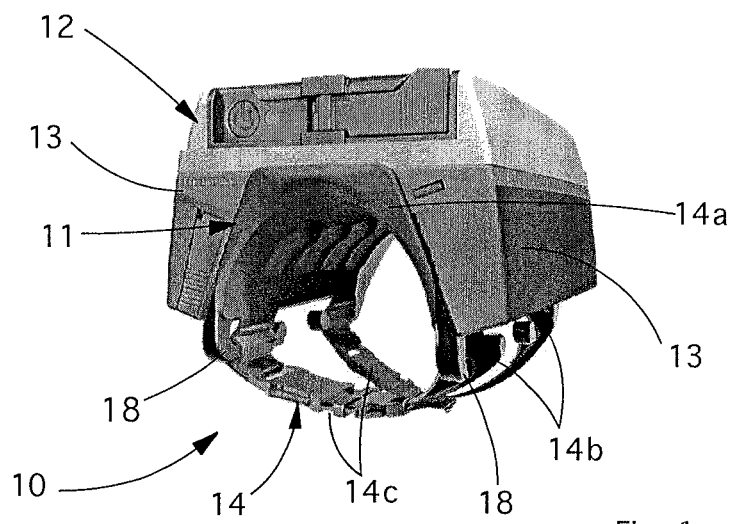
FIG. 1 is a perspective view of an electronic apparatus provided with a device according to the present invention.

With reference to FIG. 1, a device 10 according to the present invention is applied to attach to the wrist a wearable electronic apparatus, in this case a wearable computer 12.

The computer 12 comprises, in a known manner, a central body 15 and lateral sides 13, so that in can be applied ergonomically on the wrist.

Figure 2:
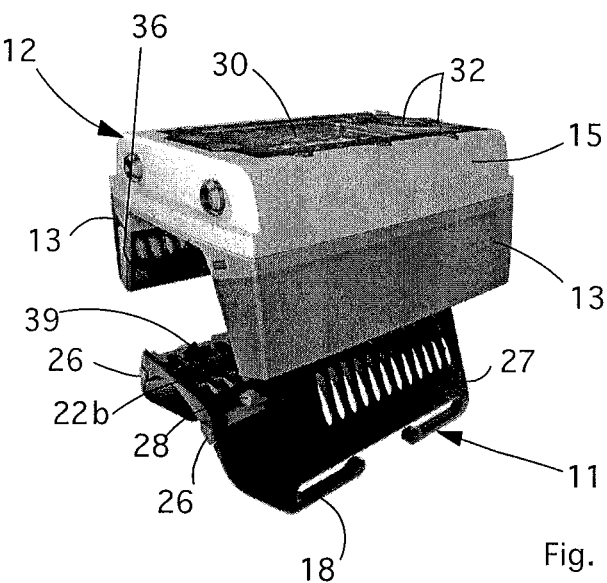
FIG. 2 is a perspective view of separate parts of FIG. 1.

The central body 15 is normally located with a base wall 33 adjacent to the surface of the wrist and the sides 13 extend from the base wall 33 of the body, defining a seating 36 coherent with the size of the wrist (FIG. 2).

The computer 12 has a display 30 and interactive keys 32, disposed visibly on the body 15 and, during use, preferably disposed towards the operator, whereas the electronic components, both for processing, typically an electronic processor and an electronic memory, and also for feed, are located inside compartments made in the body 15 and in the sides 13, in a known manner.

Figure 3:
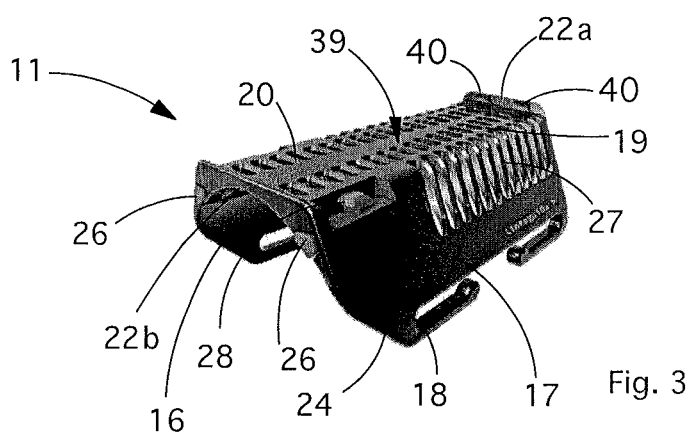
FIG. 3 is a perspective view of the attachment device in FIG. 1.
Figure 4:
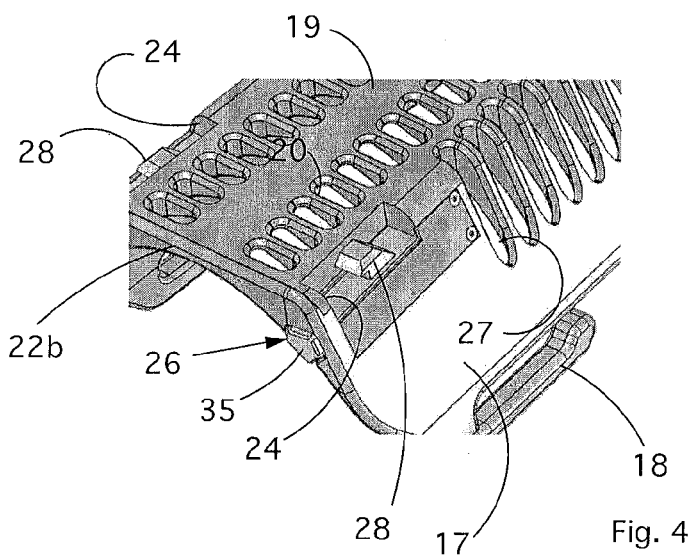
FIG. 4 is an enlarged detail of FIG. 3.

The device 10 comprises a support member 11, oblong in shape, shown in particular in FIG. 3, which is able to be located in the seating 36, so as to substantially mate with the seating (FIG. 1) and which has an assembly zone 39 on which the computer 12 is located.

The support member 11 is typically made of rigid plastic and has an upper wall 19, which defines the assembly zone 39 for the computer 12, with two lateral edges, elongated and parallel to each other, and two other shorter edges, also parallel to each other; the assembly zone 39 is able to be located in contact with the base wall 33 of the computer 12.

The support member 11 also has lateral walls 17, able to be located in contact with the sides 13, which extend transversely from elongated lateral edges of the upper wall 19.

The upper wall 19 and the lateral walls 17 delimit a seating 16 shaped ergonomically with respect to the wrist, in which the operator disposes his wrist.

The upper wall 19 has ventilation apertures 20, and the lateral walls 17 also have apertures 27 with the same function, in order to dissipate the heat produced by the computer 12 and/or the user's body, and to improve the latter's comfort.

In the seating 16 a bracelet 14 is advantageously located, for example by welding, which comprises a wrap-around part 14a made of rubber and a connection part with a buckle 14c with rapid attachment/detachment. The wrap-around part is made for example of neoprene and goes into direct contact with the operator's wrist, surrounding it to a large extent and adapting to the size of the wrist, thus allowing the whole thing to be worn easily. The wrap-around part 14a includes appendixes 14b to which the ends of the buckle 14c are attached.

Moreover, each lateral wall 17 has attachment ends 18 configured as through eyelets, on which the corresponding appendixes 14a of the bracelet are fitted, thus stabilizing the whole.

The support member 11 is able to be attached in releasable manner in the seating 16 of the wearable computer 12.

To this purpose, clamping shoulders 22a, 22b are provided, which extend from the two short lateral edges of the wall 19.

The shoulders 22a, 22b each have a curvilinear groove which cooperates due to geometric coupling with a corresponding beveled end 34 of the base wall 33 of the computer 12.

Furthermore, the shoulder 22a is provided with attachment teeth 40, which are able to achieve a geometric coupling with corresponding retaining seatings made on the corresponding beveled end 34 of the computer 12 and not shown in the drawings.

Moreover, on the part of the member 11 which in FIG. 3 is shown frontally, substantially in correspondence with the two elongated lateral edges of the upper wall 19 and in a position opposite the shoulder 22a, two longitudinal seatings 24 are made, to guide slidingly two respective attachment blocks 26, with an oblong prismatic shape (FIGS. 3, 4, 5 and 6).

Each block 26 has a first end with a button 35, which during use faces towards the outside of the member 11, a second end with a rod 21, which during use is always disposed in the seating 24, and an attachment tooth 28, protruding from the central body of the block 26 and, during use, facing towards the base wall 33 of the computer 12.

On the rod 21a helical spring 25 is fitted, which normally keeps the block 26 thrust towards the outside, so that the button 35 is thus easily accessible for the user.

Figure 6:
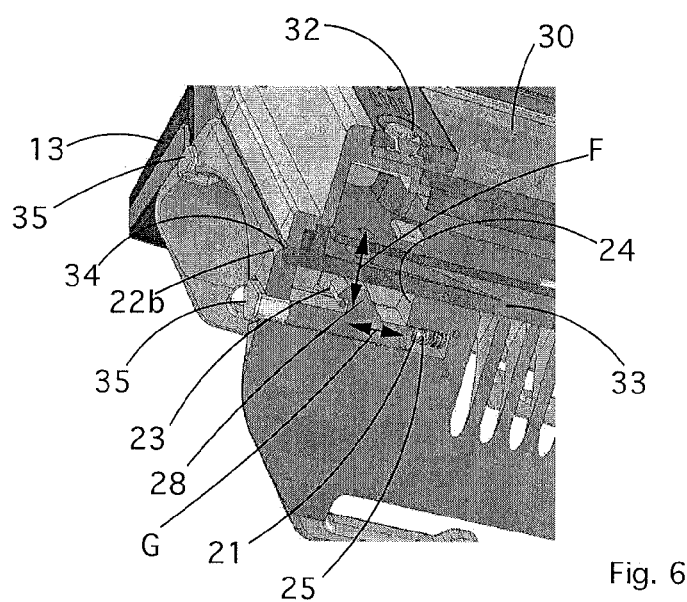
FIG. 6 is a section of another enlarged detail of FIG. 3.

The sliding of the block 26 in the seating 24, and hence the displacement of the attachment tooth 28, in the direction indicated by the arrow G in FIG. 6, is determined by a pressure on the button 35, which compresses the spring 25. The pressure on the button 35 displaces the block 26 towards the inside of the member 11 while the elastic reaction of the spring 25 tends to displace it towards the outside.

A retaining peg 23 is made in a compartment on both sides of the base wall 33 of the computer 12, parallel to the plane on which the base 33 lies and protruding towards the outside, in a position coordinated with that of each attachment tooth 28 of the block 26 (FIG. 6).

Figure 5:
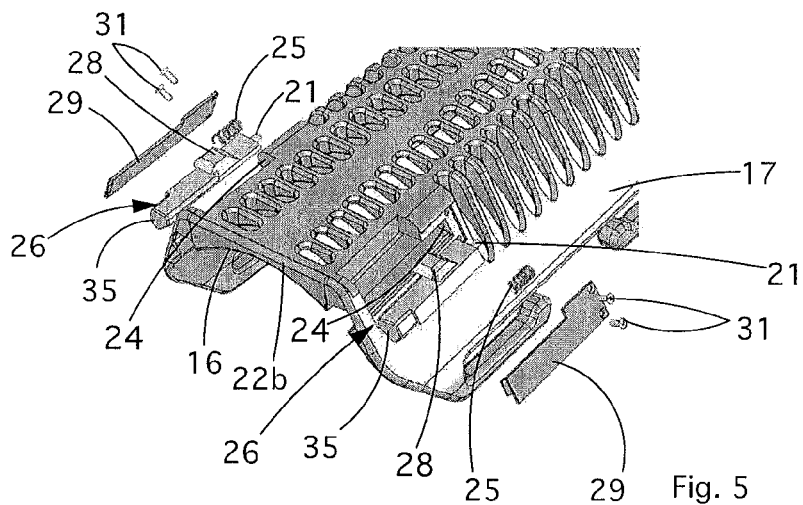
FIG. 5 is a perspective view of separate parts of FIG. 4.

The seating 24 is closed by a cover 29, attached by screws 31 to the wall 17, both for safety reasons and for the protection of the snap-in attachment mechanism, and also for aesthetic reasons (FIG. 5).

In order to use the attachment device 10, the member 11 is inserted into the seating 16 and pre-assembled, locating the computer 12 on the assembly zone 39. In particular, first the computer 12 is inclined towards the shoulder 22a, so as to achieve coupling with the attachment teeth 36 of the shoulder 22a, and then the positioning movement is completed, coupling the shoulder 22b with the relative end 34 of the base wall 33, so that the external shape of the member 11 mates with that of the seating of the computer 12.

By thrusting the member 11 towards the base wall 33, in the direction indicated by the arrow F in FIG. 6, this determines the sliding of the retaining peg 23 along an inclined edge of the attachment tooth 28 and a corresponding thrust on the latter so as to compress the spring 25 and create, temporarily, the space for the peg 23 to pass; the latter moves to establish a clamping position in an undercut of the attachment tooth 28, which in turn returns to the normal position, thrust by the elastic reaction of the spring 25. In fact, the spring 25 returns the block 26 to its normal position, thus clamping the peg 23 to the tooth 28 in snap-in manner and securely clamping the member 11 to the computer 12.

At this point the bracelet 14 is attached, determining the secure attachment of the whole to the wrist.

Removal is effected by means of a substantially inverse operation, in which the user simultaneously presses the two buttons 35, compressing the spring 25. In this way, simultaneously, the tooth 28 no longer interferes with the peg 23.

Removal is completed in a few seconds by lifting the computer 12 out of the member 11. However, the member 11 remains attached to the user's wrist, thanks to the bracelet 14 and its ergonomic shape.

It is clear that modifications and/or additions of parts may be made to the attachment device 10 for a wearable electronic apparatus 12 and the wearable electronic apparatus 12 comprising said attachment device 10 as described heretofore, without departing from the field and scope of the present invention.

It is also clear that, although the present invention has been described with reference to some examples, a person of skill in the art shall certainly be able to achieve many other equivalent forms of attachment device for a wearable electronic apparatus and wearable electronic apparatus comprising said attachment device, having the characteristics as set forth in the claims and hence all coming within the field of protection defined thereby.

The invention claimed is:

1. An attachment device for attaching a wearable electronic apparatus to a part of the body of an operator, said attachment device comprising a support member, which includes an assembly zone on which said wearable electronic apparatus is located and an attachment element which clamps said support member to said operator's wrist, forearm, ankle or other parts of the arm or of the leg, attachment/detachment means being selectively releasable and provided in association with said assembly zone in order to cooperate with corresponding attachment portions of said wearable electronic apparatus, wherein the wearable electronic apparatus comprises a central body and lateral sides for applying the wearable electronic apparatus ergonomically on the said operator's wrist, fore-arm, ankle or other parts of the arm or of the leg, the support member is formed by a substantially flat central wall having lateral edges, defining said assembly zone on which a base wall of the central body of the wearable electronic apparatus is able to be located, and by two lateral walls on said support member that are in contact with said lateral sides of the wearable electronic apparatus, the two lateral walls extending transversely from the lateral edges of said substantially flat central wall define, in cooperation with the substantially flat central wall, a housing seating in which a curved surface of said part of the said operator's wrist, fore-arm, ankle or other parts of the arm or of the leg is ergonomically housed and partly surrounded.

2. The attachment device as in claim 1, wherein said support member is rigid.

3. The attachment device as in claim 1, wherein said support member is flexible.

4. The attachment device as in claim 1, wherein said attachment element is flexible.

5. The attachment device as in claim 1, wherein said attachment element is rigid.

6. The attachment device as in claim 1, wherein said attachment/detachment means are made in correspondence with said central wall.

7. The attachment device as in claim 1, wherein said attachment element is formed by a wrap-around part made of flexible material, attached to said housing seating, and a connection part able to surround at least a second surface of said part of the body of said operator, substantially complementary to said first surface.

8. The attachment device as in claim 7, wherein said support member has attachment ends on which a part of a closing element is located.

9. The attachment device as in claim 1, wherein said attachment/detachment means comprises first attachment elements able to cooperate through geometric coupling with a corresponding first attachment portion of said base wall of said wearable electronic apparatus.

10. The attachment device as in claim 9, wherein said first attachment elements comprise shoulder elements which extend transversely from said central wall and which are of a shape suitable to cooperate in geometric coupling with corresponding ends of said base wall of said wearable electronic apparatus, and wherein a first of said shoulder elements is provided with attachment teeth.

11. The attachment device as in claim 1, wherein said attachment/detachment means comprises second attachment elements able to cooperate in a snap-in manner with a corresponding second attachment portion located on said base wall of said wearable electronic apparatus.

12. An attachment device for attaching a wearable electronic apparatus to a part of the body of an operator, said attachment device comprising a support member, which includes an assembly zone on which said wearable electronic apparatus is located and an attachment element which clamps said support member to said part of the body of said operator, attachment/detachment means being selectively releasable and provided in association with said assembly zone in order to cooperate with corresponding attachment portions of said wearable electronic apparatus, wherein the wearable electronic apparatus comprises a central body and lateral sides for applying the wearable electronic apparatus ergonomically on the operator's wrist, fore-arm, ankle or other parts of the arm or of the leg, the support member is formed by a substantially flat central wall having later edges, defining said assembly zone on which a base wall of the central body of the wearable electronic apparatus is able to be located, and by two lateral walls able to be located in contact with said lateral sides of the wearable electronic apparatus, said two lateral walls extending transversely from the lateral edges of said substantially flat central wall and defining a housing seating having a band shape in which a first surface of said part of the body of said operator is ergonomically housed and partly surrounded wherein said attachment/detachment means comprises second attachment elements able to cooperate in a snap-in manner with a corresponding second attachment portion located on said base wall of said wearable electronic apparatus and wherein said second attachment elements comprise at least a drive element slidingly guided inside a longitudinal seating made on at least one lateral side of said wearable electronic device, said drive element having one end with a button and one end with a rod on which a spring and a tooth portion are fitted, said spring being able to act elastically on said drive element so as to determine a condition of snap-in attachment in which said tooth portion interferes with said second attachment portion, said button element being able to be driven, in a direction opposite to the direction of action of said spring, in order to make said drive element slide in said longitudinal seating so as to determine a detached condition in which said tooth portion does not interfere with said second attachment portion.

13. The attachment device as in claim 12, wherein said support member on which a part of a closing element is located and said attachment ends are through eyelets made on ends of said lateral sides.

14. The attachment device as in claim 12, wherein said support member has one or more ventilation apertures.

15. An attachment device for attaching a wearable electronic apparatus having at least one lateral side to a part of the body of an operator, said attachment device comprising a support member, which includes an assembly zone on which said wearable electronic apparatus having at least one lateral side is located and an attachment element which clamps said support member to said part of the body of said operator, attachment/detachment means being selectively releasable and provided in association with said assembly zone in order to cooperate with corresponding attachment portions of said wearable electronic apparatus having at least one lateral side wherein said attachment/detachment means comprises second attachment elements able to cooperate in a snap-in manner with a corresponding second attachment portion located on said base wall of said wearable electronic apparatus having at least one lateral side and wherein said second attachment elements comprise at least a drive element slidingly guided inside a longitudinal seating made on at least one lateral side of said wearable electronic apparatus having at least one lateral side, said drive element having one end with a button and one end with a rod on which a spring and a tooth portion are fitted, said spring being able to act elastically on said drive element so as to determine a condition of snap-in attachment in which said tooth portion interferes with said second attachment portion, said button element being able to be driven, in a direction opposite to the direction of action of said spring, in order to make said drive element slide in said longitudinal seating so as to determine a detached condition in which said tooth portion does not interfere with said second attachment portion.

* * * * *